(12) United States Patent
Takemoto et al.

(10) Patent No.: US 11,745,682 B2
(45) Date of Patent: Sep. 5, 2023

(54) BUMPER FOR VEHICLE

(71) Applicant: NISSAN MOTOR CO., LTD., Yokohama (JP)

(72) Inventors: Shinichirou Takemoto, Kanagawa (JP); Shinya Mihara, Kanagawa (JP); Masaki Koyama, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/798,708

(22) PCT Filed: Feb. 17, 2020

(86) PCT No.: PCT/IB2020/000133
§ 371 (c)(1),
(2) Date: Aug. 10, 2022

(87) PCT Pub. No.: WO2021/165713
PCT Pub. Date: Aug. 26, 2021

(65) Prior Publication Data
US 2023/0142321 A1    May 11, 2023

(51) Int. Cl.
*B60R 19/18* (2006.01)
*B60R 19/04* (2006.01)

(52) U.S. Cl.
CPC .............. *B60R 19/18* (2013.01); *B60R 19/04* (2013.01); *B60R 2019/1813* (2013.01); *B60R 2019/1853* (2013.01)

(58) Field of Classification Search
CPC . B60R 19/18; B60R 19/04; B60R 2019/1853; B60R 2019/1813
See application file for complete search history.

(56) References Cited

U.S. PATENT DOCUMENTS

| 8,979,146 B2 * | 3/2015 | Kano | ................ B60R 19/03 |
| | | | 293/122 |
| 2014/0367982 A1 | 12/2014 | Kano et al. | |

(Continued)

FOREIGN PATENT DOCUMENTS

| JP | 2013-123927 A | 6/2013 |
| JP | 2014-218179 A | 11/2014 |

(Continued)

*Primary Examiner* — Dennis H Redder
*Assistant Examiner* — Melissa Ann Bonifazi
(74) *Attorney, Agent, or Firm* — Foley & Lardner LLP

(57) ABSTRACT

A vehicle bumper is provided integrally to include metal beam-extension portions on both right-and-left end sides of a metal bumper-beam portion. In this vehicle bumper, the bumper-beam portion and the beam-extension portion include a vertical wall portion, an upper wall portion and a lower wall portion, and a resin reinforcing rib is joined to inner surfaces of a void formed of each of the wall portions. In addition, in this vehicle bumper, an extension dimension of the upper wall portion and the lower wall portion of the beam-extension portion is larger than an extension dimension of the upper wall portion and the lower wall portion in the bumper-beam portion, the resin reinforcing rib in the beam-extension portion is joined to the vertical wall portion, the upper wall portion, and the lower wall portion of the beam-extension portion; and the stiffness of the bumper-beam portion is higher than the stiffness of the beam-extension portion.

16 Claims, 6 Drawing Sheets

(56) References Cited

U.S. PATENT DOCUMENTS

| | | | |
|---|---|---|---|
| 2016/0001723 A1 | 1/2016 | Oku et al. | |
| 2018/0215331 A1 | 8/2018 | Gumpina et al. | |
| 2021/0268976 A1* | 9/2021 | Gibeau | ................... B60R 19/18 |

FOREIGN PATENT DOCUMENTS

| | | | | |
|---|---|---|---|---|
| JP | 2016-097719 A | 5/2016 | | |
| JP | 6265889 B2 | 1/2018 | | |
| JP | 2019-142379 A | 8/2019 | | |
| KR | 1020150129204 A | 11/2015 | | |
| WO | WO-2014069108 A1 * | 5/2014 | ............. | B60R 19/18 |
| WO | WO-2020053617 A1 * | 3/2020 | ............. | B60R 19/18 |
| WO | WO-2020053674 A1 * | 3/2020 | ............ | B60R 19/023 |

* cited by examiner

BUMPER FOR VEHICLE

TECHNICAL FIELD

The present invention relates to a vehicle bumper to be used for vehicles such as automobiles.

BACKGROUND ART

Examples of related-art vehicle bumpers include a vehicle bumper disclosed in Patent Document 1. The vehicle bumper disclosed in Patent Document 1 is a vehicle bumper formed by molding a bumper beam made of fiber reinforced plastics and bumper extensions made of fiber reinforced plastics integrally with each other. The bumper beam has a Θ-shape in cross section by including a unidirectional member in which reinforcing fibers are oriented in one direction, and a member including a cloth member in which the reinforcing fibers are woven. This vehicle bumper has desired strength and stiffness despite its lightweight configuration, and exhibits performance of absorbing energy to be generated by large external force of a collision or the like.

CITATION LIST

Patent Document

Patent Document 1: Japan Patent No. 6,265,889

SUMMARY OF INVENTION

Technical Problem

However, although the vehicle bumpers as described above are advantageous to weight reduction due to their integrally molded structures of the fiber reinforced plastics, if the beam extensions break during application of the large external force of a collision or the like, impact energy may not be sufficiently absorbed. In other words, although it is desired that the vehicle bumpers, which are made of the fiber reinforced plastics and absorb the impact energy along with their destruction, be destroyed as finely as possible at a time of the absorption, the vehicle bumpers may break into large pieces depending, for example, on a position at which the external force is applied. If the large breakage occurs, resistance force sharply decreases. Thus, the related-art vehicle bumpers have a problem that the performance of absorbing the impact energy is insufficient, and such problems have remained unsolved.

The present invention has been made in view of the relate-art problems as described above, and an object thereof is to provide a vehicle bumper that can be reduced in weight, and is capable of reliably absorbing impact energy to be generated by large external force of a collision or the like.

Solution to Problem

According to the present invention, there is provided a vehicle bumper integrally including metal beam-extension portions being a part to be fixed to a vehicle body on both right-and-left end sides of a metal bumper-beam portion. In this vehicle bumper, the bumper-beam portion and the beam-extension portion include a vertical wall portion that faces a vehicle body side, an upper wall portion and a lower wall portion that extend respectively from an upper end and a lower end of the vertical wall portion to the vehicle body side, and a resin reinforcing rib is joined to inner surfaces of a void formed of the vertical wall portion, the upper wall portion, and the lower wall portion. In addition, in this vehicle bumper, an extension dimension of the upper wall portion and the lower wall portion of the beam-extension portion is larger than an extension dimension of the upper wall portion and the lower wall portion in the bumper-beam portion, the resin reinforcing rib in the beam-extension portion is joined to the vertical wall portion, the upper wall portion, and the lower wall portion of the beam-extension portion; and the stiffness of the bumper-beam portion is higher than the stiffness of the beam-extension portion.

Advantageous Effects of Invention

The vehicle bumper according to the present invention has a structure in which both the bumper beam portion and the beam extension portions are made of a metal, and each include the vertical wall portion, the upper wall portion, and the lower wall portion. In addition, the resin reinforcing rib is joined to the inner surfaces of the void formed on an inner side relative to the wall portions. With this structure, weight reduction of the vehicle bumper is achieved, and predetermined stiffness of the bumper itself is secured.

Yet further, in case where large external force of a collision or the like is applied, the vehicle bumper absorbs impact energy mainly at the beam extension portion having the relatively low stiffness. At this time, the reinforcing rib is not merely destroyed, and the reinforcing rib is destroyed while the metal is deformed in a buckling manner. This is because the vehicle bumper has the structure in which the hard resin (reinforcing rib) is joined to the metal that has stretch properties, that is, the structure in which the reinforcing rib in each of the beam extension portions is jointed to three sides, specifically, to the vertical wall portion, the upper wall portion, and the lower wall portion of the corresponding one of the beam extension portions. With this, in absorbing the impact energy at the beam extension portion, the vehicle bumper is finely destroyed with the reinforcing ribs not largely breaking along with the deformation of the metal.

In such a way, the vehicle bumper according to the present invention can be reduced in weight, and is enabled to reliably absorb the impact energy to be generated by the large external force of a collision or the like.

DESCRIPTION OF THE EMBODIMENTS

First Embodiment

Figure 1:
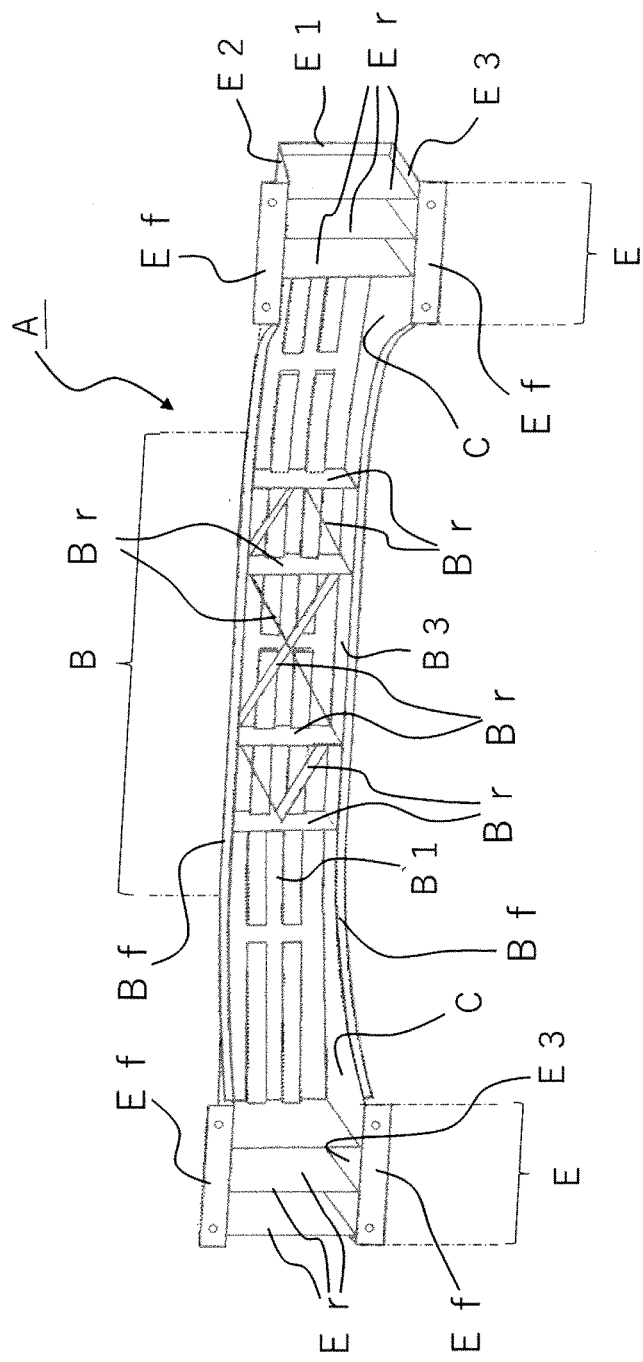
FIG. 1 is a perspective view of a rear side of a vehicle bumper according to the present invention.
Figure 2:
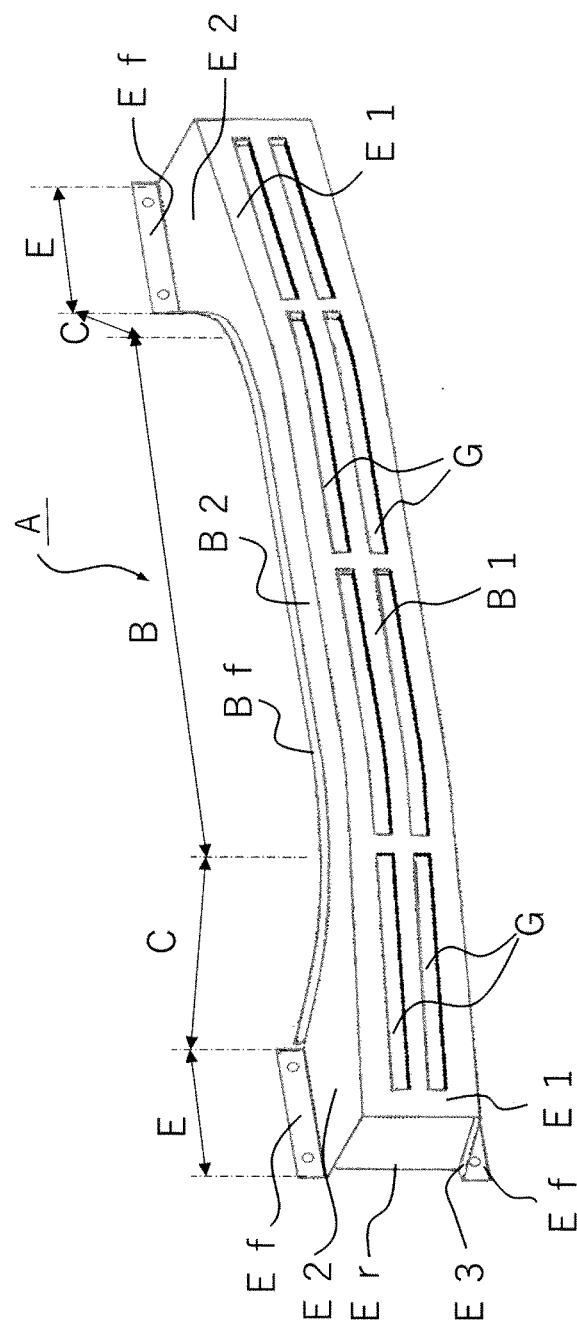
FIG. 2 is a perspective view of a front side of the vehicle bumper illustrated in FIG. 1.
Figure 3:
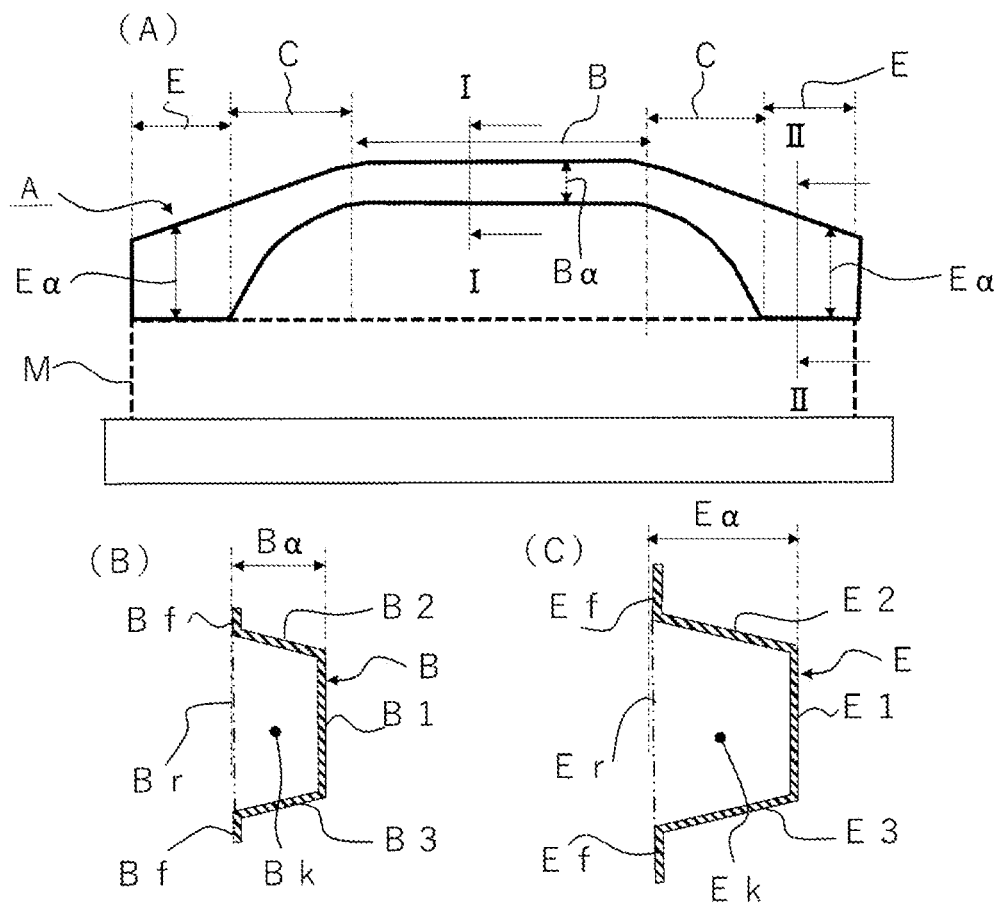
FIG. 3A is a plan view of the vehicle bumper illustrated in FIG. 1.
FIG. 3B is a cross-sectional view as viewed in a direction indicated by arrows I-I.
FIG. 3C is a cross-sectional view as viewed in a direction indicated by arrows II-II.

FIG. 1 to FIGS. 3A, 3B and 3C are explanatory views of a vehicle bumper according to an embodiment of the present invention.

This vehicle bumper A in the illustration integrally includes metal beam-extension portions E being parts to be fixed to a vehicle body (part of which is indicated by dotted lines in FIG. 3A) M on both right-and-left end sides of a metal bumper-beam portion B. Note that, although the vehicle bumper A includes a vehicle bumper A to be used at a front portion of the vehicle body M and a vehicle bumper A to be used at a rear portion of the same, basic configurations of both the vehicle bumpers A are equivalent to each other. Thus, specific distinction therebetween is not made in this embodiment. In addition, in this embodiment, an upper-and-lower direction, a right-and-left direction, and positional relationships between components are described as those in a posture in which the components are fixed to the vehicle body M.

The bumper beam portion B and the beam extension portions E are a metal integral structure without seams that are formed as a result of welding or the like, and their materials are not limited in particular. It is desired that steel materials such as high-strength steel be used, or an aluminum alloy and the like may be used. The bumper beam portion B and the beam extension portions E can be formed, for example, by pressing or die-casting.

The bumper beam portion B and the beam extension portions E respectively include vertical wall portions B1 and E1 that face a side in which the vehicle body M is present, and respectively include upper wall portions B2 and E2 and lower wall portions B3 and E3 that extend respectively from upper ends and lower ends of the vertical wall portions B1 and E1 to the vehicle body side. In addition, in the bumper beam portion B and the beam extension portions E, voids Bk and Ek that are opened to the side in which the vehicle body M is present are formed of the wall portions B1, E1, B2, E2, B3, and E3. Resin reinforcing ribs Br and Er are joined respectively to inner surfaces of the voids Bk and Ek. In particular, in each of the beam extension portions E, the reinforcing ribs Er are joined to three sides, specifically, to the vertical wall portion E1, the upper wall portion E2, and the lower wall portion E3 of a corresponding one of the beam extension portions E.

Materials of the reinforcing ribs Br and Er are not limited in particular. It is desired that fiber reinforced plastics be used. For example, it is desired that carbon-fiber-reinforced plastics (CFRP) or glass-fiber reinforced plastics (GFRP) containing a thermoplastic resin or a thermosetting resin as a matrix be used, or engineering plastics or the like may be used. The reinforcing ribs Br and Er can be directly joined to the bumper beam portion B and the beam extension portions E by injection molding or compression molding of the resins.

As illustrated particularly in FIGS. 3A, 3B and 3C, in the above-described vehicle bumper A, an extension dimension E$\alpha$ of each of the upper wall portion E2 and the lower wall portion E2 in each of the beam extension portions E is larger than an extension dimension B$\alpha$ of each of the upper wall portion B2 and the lower wall portion B3 in the bumper beam portion B (E$\alpha$>B$\alpha$). In conformity therewith, as illustrated in FIG. 3A, the vehicle bumper A has an arcuate shape as a whole in plan view by including continuous regions C in each of which the extension dimension B$\alpha$ of each of the upper wall portion B2 and the lower wall portion B3 of the bumper beam portion B gradually increases from the bumper beam portion B to a corresponding one of the beam extension portions E. The continuous regions C in the illustrated example each have a round shape in plan view.

Further, in the vehicle bumper A, stiffness Bs of the bumper beam portion B is higher than stiffness Es of each of the beam extension portions E (Bs>Es). Still further, it is more desired that the vehicle bumper A have a configuration in which stiffness Cs of each of the continuous regions C is relatively lower than the stiffness Es of each of the beam extension portions E (Es>Cs). Now, specific structures for causing the stiffness of each of the portions to be relatively different from each other are described.

The vehicle bumper A has a structure in which a total quantity of the reinforcing ribs Br in the bumper beam portion B is larger than a total quantity of the reinforcing ribs Er in each of the beam extension portions E. In such a structure, by appropriately selecting the numbers of the reinforcing ribs Br and Er, their sizes, shapes, and volumes per piece, the total quantity of the reinforcing ribs Br in the bumper beam portion B can be relatively increased.

In the bumper beam portion B in the illustrated example, the plurality of reinforcing ribs Br are arrayed in a plurality of directions. Specifically, four vertical reinforcing ribs Br are arranged at a predetermined interval in the vehicle right-and-left direction, two oblique reinforcing ribs Br are arranged while crossed each other between two central reinforcing ribs Br, and other two oblique reinforcing ribs Br are arranged between each of the central reinforcing ribs Br and a corresponding one of outer reinforcing ribs Br.

In each of the beam extension portions E in the illustrated example, the plurality of (three) reinforcing ribs Er are arrayed at a predetermined interval in the vehicle right-and-left direction. As described above, the reinforcing ribs Er are joined to the three sides, specifically, to the vertical wall portion E1, the upper wall portion E2, and the lower wall portion E3 of the corresponding one of the beam extension portions E, and are arranged substantially parallel to a front-and-rear direction of the vehicle body M. Thus, the plurality of reinforcing ribs Er are arranged parallel to each other. In this context, the beam extension portions E are each a structure in which side end portions of the vertical wall portion E1, the upper wall portion E2, and the lower wall portion E3 jetty to an outer side relative to the reinforcing ribs Er. In other words, in each of the beam extension portions E, the reinforcing ribs Er are arranged on an inner side relative to edge portions of a corresponding one of the beam extension portions E.

As a specific example of setting the stiffness Cs of each of the continuous regions C to be relatively lower than the stiffness Es of each of the beam extension portions E, the vehicle bumper A has a structure in which the reinforcing ribs are absent in the continuous regions C. Note that, although the vehicle bumper A may have a structure including the reinforcing ribs in the continuous regions C, in this case, it is appropriate, for example, to set a total quantity of reinforcing ribs in the continuous regions C to be relatively smaller than the total quantity of the reinforcing ribs Er in each of the beam extension portions E.

The vehicle bumper A has such a structure in which the stiffness decreases in a stepwise manner in an order of the bumper beam portion B, the beam extension portions E, and the continuous regions C (Bs>Es>Cs).

Further, in order that predetermined stiffness is secured, the vehicle bumper A has the following structure. Specifically, as illustrated in FIG. 3B, in the vehicle lateral direction, the bumper beam portion B of the vehicle bumper A has a hat cross-sectional shape by including outward flanges Bf and Bf respectively at the tip of the upper wall portion B2 and the lower wall portion B3 in their respective extension directions. The flanges Bf and Bf of the bumper beam portion B are formed also in the continuous regions C.

Still further, as illustrated in FIG. 3C, in the vehicle lateral direction, the beam extension portions E of the vehicle bumper A each have a hat cross-sectional shape by including outward flanges Ef and Ef respectively at the tip of the upper wall portions E2 and the lower wall portions E3 in their respective extension directions. The flanges Ef and Ef of each of the beam extension portions E are each larger than each of the flanges Bf of the bumper beam portion B, and are used as portions to be fixed to the vehicle body M.

Yet further, as described above, the vehicle bumper A may employ the reinforcing ribs Br and Er made of the fiber reinforced plastics. In this case, it is desired that the reinforcing ribs Br and Er be formed under a state in which reinforcing fibers are oriented in a direction from the upper wall portions B2 and E2 to the lower wall portions B3 and E3.

Note that, in the vehicle bumper A in the illustrated example, a plurality of groove portions G that are elongated in the vehicle right-and-left direction and opened to a vehicle outside are formed in the vertical wall portion B1 of the bumper beam portion B. With this, the vertical wall portion B1 of the bumper beam portion B has a front-and-rear inverted recess-protrusion shape. Also by such a structure, the stiffness of the bumper beam portion B can be secured.

In the structure of the vehicle bumper A having the above-described configuration, both the bumper beam portion B and the beam extension portions E are made of a metal, and respectively include the vertical wall portions B1 and E1, the upper wall portions B2 and E2, and the lower wall portions B3 and E3. In addition, the reinforcing ribs Br and Er made of the resin are joined to the inner surfaces of the voids Bk and Ek formed respectively of the wall portions. With this structure, weight reduction of the vehicle bumper A is achieved, and the predetermined stiffness of the bumper itself is secured.

Further, in the vehicle lateral direction, the bumper beam portion B and the beam extension portions E of the vehicle bumper A have the hat cross-sectional shapes by respectively including the flanges Bf and Ef at the tip of the upper wall portions B2 and E2 and the lower wall portions B3 and E3 in their extension directions, that is, along opening edge portions of the voids Bk and Ek. Also with this structure, the weight reduction is achieved, and the predetermined stiffness of the bumper itself is secured.

Still further, in the vehicle bumper A, between the bumper beam portion B and the beam extension portions E, the continuous regions C in each of which an extension dimension Bα of each of the upper wall portion B2 and the lower wall portion B3 of the bumper beam portion B gradually increases are provided. Also with this structure having the arcuate shape as a whole in plan view, the weight reduction is achieved, and the predetermined stiffness of the bumper itself is secured.

Yet further, in case where large external force of a collision or the like is applied, the vehicle bumper A absorbs impact energy basically mainly at the beam extension portion E having the relatively low stiffness except a case where the external force is applied in a different direction as described below. In this case, a vehicle bumper having an integrally-molded structure of the fiber reinforced plastics may break into large pieces. If the large breakage occurs, resistance force sharply decreases, or the vehicle bumper A drops from the vehicle body.

In contrast, the above-described vehicle bumper A has the structure in which the hard resins (reinforcing ribs) are joined to the metal that has stretch properties, that is, the structure in which the reinforcing ribs Er in each of the beam extension portions E are jointed to the three sides, specifically, to the vertical wall portion E1, the upper wall portion E2, and the lower wall portion E3 of the corresponding one of the beam extension portions E. Thus, the reinforcing ribs Br and Er are not merely destroyed, and the reinforcing ribs Br and Er are destroyed while the metal is deformed in a buckling manner. With this, in absorbing the impact energy at the beam extension portion E, the vehicle bumper A is finely destroyed with the reinforcing ribs Er not largely breaking along with the deformation of the metal.

In such a way, the above-described vehicle bumper A can be reduced in weight, and is enabled to reliably absorb the impact energy to be generated by the large external force of a collision or the like. In addition, the vehicle bumper A can be prevented from dropping from the vehicle body M.

Note that, if the vehicle bumper A has a structure in which the reinforcing ribs Er in each of the beam extension portions E are spaced away from any one of the vertical wall portion E1, the upper wall portion E2, and the lower wall portion E3 of the corresponding one of the beam extension portions E, or has a structure in which the reinforcing ribs Er are inclined relative to the front-and-rear direction of the vehicle body M, in the case where the external force is applied to the beam extension portion E, only the buckling of the metal may occur earlier to cause the sharp decrease in resistance force, or the reinforcing ribs Er may largely break to cause the sharp decrease in resistance force.

As a countermeasure, the above-described vehicle bumper A has the structure in which the reinforcing ribs Er in each of the beam extension portions E are jointed to the three sides, specifically, to the vertical wall portion E1, the upper wall portion E2, and the lower wall portion E3 of the corresponding one of the beam extension portions E, and are arranged substantially parallel to the front-and-rear direction of the vehicle body M. This enables the vehicle bumper A to cause the buckling of the metal and the destruction of the reinforcing rib Er to progress substantially simultaneously with each other in the case where the external force is applied to the beam extension portion E. With this, such a risk that the resistance force sharply decreases can be prevented, and the impact energy to be generated by the external force can be efficiently absorbed.

Figure 4:
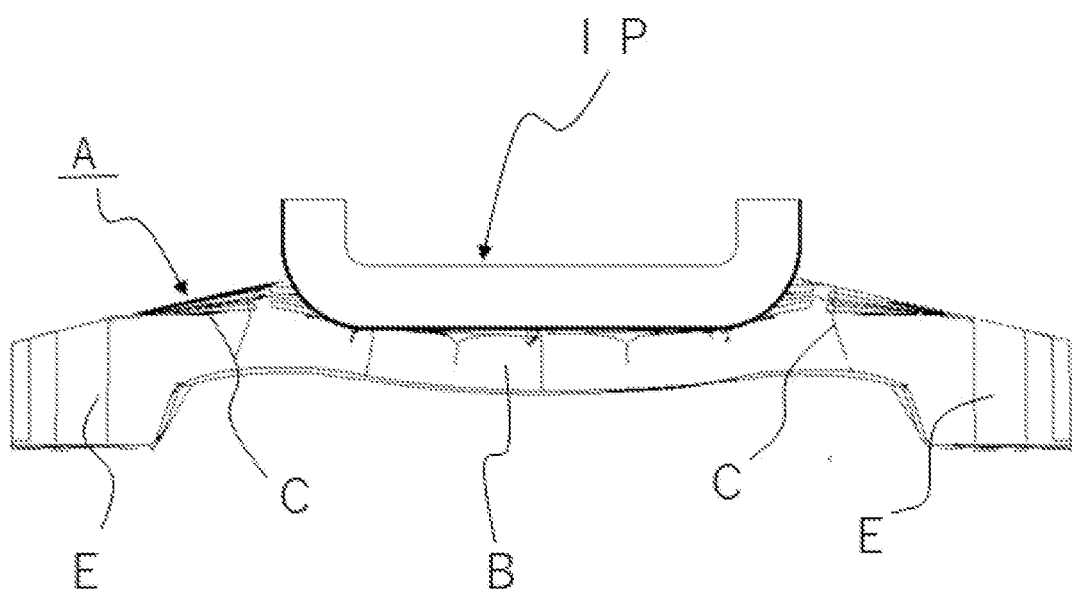
FIG. 4 is a plan view illustrating a state in which external force is applied to a front.

FIG. 4 is a view illustrating a state in which the large external force is applied to a front by a crash-test impactor IP. The vehicle bumper A according to this embodiment has the structure in which the stiffness decreases in the stepwise manner in the order of the bumper beam portion B, the beam extension portions E, and the continuous regions C (Bs>Es>Cs). Thus, if the external force is applied to the front, the continuous regions C having the lowest stiffness are buckled. Subsequently, in the beam extension portions E of the vehicle bumper A, the reinforcing ribs Er are destroyed while the metal is deformed in the buckling manner. Lastly, in the bumper beam portion B, the reinforcing ribs Br are destroyed while the metal is deformed in the buckling manner.

As described above, in the continuous regions C, the bumper extension portions E, and the bumper beam portion B, the buckling deformation of the metal and the destruction of the reinforcing ribs Br and Er are caused in the stepwise manner. This enables the vehicle bumper A to efficiently absorb the impact energy.

In the above-described vehicle bumper A, the total quantity of the reinforcing ribs Br in the bumper beam portion B is set to be larger than the total quantity of the reinforcing ribs Er in each of the beam extension portions E. This enables weight reduction even with simple structures. In addition, the stiffness of the bumper beam portion B can be set to be relatively high, and performance of absorbing the impact enemy can be further increased.

Further, in the above-described vehicle bumper A, the plurality of reinforcing ribs Br in the bumper beam portion B are arrayed in the plurality of directions. This enables the weight reduction even with simple structures. In addition, the stiffness of the bumper beam portion B can be set to be relatively high, and the performance of absorbing the impact energy can be further increased.

Still further, the above-described vehicle bumper A employs the structure in which the bumper beam portion B and each of the beam extension portions E have the hat cross-sectional shapes by respectively including the flanges Bf and Ef in the vehicle lateral direction. With this, even in the case where the large external force is applied, the upper wall portions B2 and E2 and the lower wall portions B3 and E3 are prevented from being easily deformed in a manner of opening upward and downward. In this way, despite having an open cross-sectional structure that is advantageous to the weight reduction, the vehicle bumper A can further increase the performance of absorbing the impact energy to be generated by the large external force while suppressing the likely buckling deformation of the thin metal.

Yet further, the above-described vehicle bumper A employs the reinforcing ribs Br and Er made of the fiber reinforced plastics in which reinforcing fibers are oriented in the direction from the upper wall portions B2 and E2 to the lower wall portions B3 and E3. With this, even in the case where the large external force is applied, the upper wall portions B2 and E2 and the lower wall portions B3 and E3 are prevented from being easily deformed in the manner of opening upward and downward. In this way, the vehicle bumper A further increases the performance of absorbing the impact energy to be generated by the large external force while suppressing the likely buckling deformation of the thin metal.

Yet further, the above-described vehicle bumper A has the arcuate shape as a whole in plan view by including the continuous regions C between the bumper beam portion B and the beam extension portions E. Thus, even in the case where the external force is applied to the front, the vehicle bumper A suppresses the deformation of the metal plate by counteracting stress that causes the metal plate to be deformed in a warped manner. In this way, despite having the open cross-sectional structure that is advantageous to the weight reduction, the vehicle bumper A can further increase the performance of absorbing the impact energy to be generated by the large external force while suppressing the likely buckling deformation of the thin metal.

Yet further, the above-described vehicle bumper A employs the structure in which the reinforcing ribs are absent in the continuous regions C. With this, a structure in which the stiffness of each of the continuous regions C is set to be relatively lower than the stiffness of each of the bumper extension portions E can be easily formed. This structure can contribute to the increase of the above-described performance of absorbing the impact energy.

Figure 5:
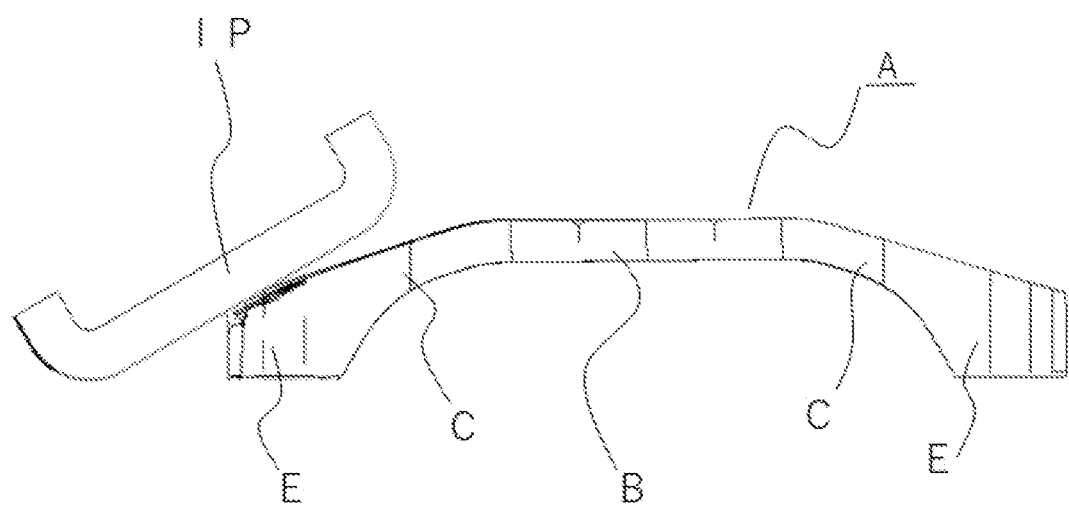
FIG. 5 is a plan view illustrating a state in which the external force is applied to a corner.

FIG. 5 is a view illustrating a state in which the large external force is applied to a corner portion by the crash-test impactor IP. The vehicle bumper A absorbs the impact energy mainly at the beam extension portion E while the reinforcing ribs Er are destroyed with the metal deformed in the buckling manner.

At this time, since the plurality of reinforcing ribs Er independent of each other are arrayed at the predetermined interval in the vehicle right-and-left direction in each of the beam extension portions E, when the external force is applied to the corner portion, the reinforcing ribs Er are destroyed sequentially from outer ones along with the buckling deformation of the metal. This enables the vehicle bumper A to advantageously absorb the impact energy, and to be more reliably prevented from dropping from the vehicle body M.

In addition, the side end portions of the vertical wall portion E1, the upper wall portion E2, and the lower wall portion E3 of each of the beam extension portions E jetty to the outer side relative to the reinforcing ribs Er. Thus, when the external force is applied to the corner portion, the above-described vehicle bumper A prevents the reinforcing ribs Er from being destroyed earlier. In other words, when the external force is applied, the vehicle bumper A lets the metal be deformed in the buckling manner earlier to destroy the reinforcing ribs Er. With this, the performance of absorbing the impact energy can be further increased.

Figure 6:
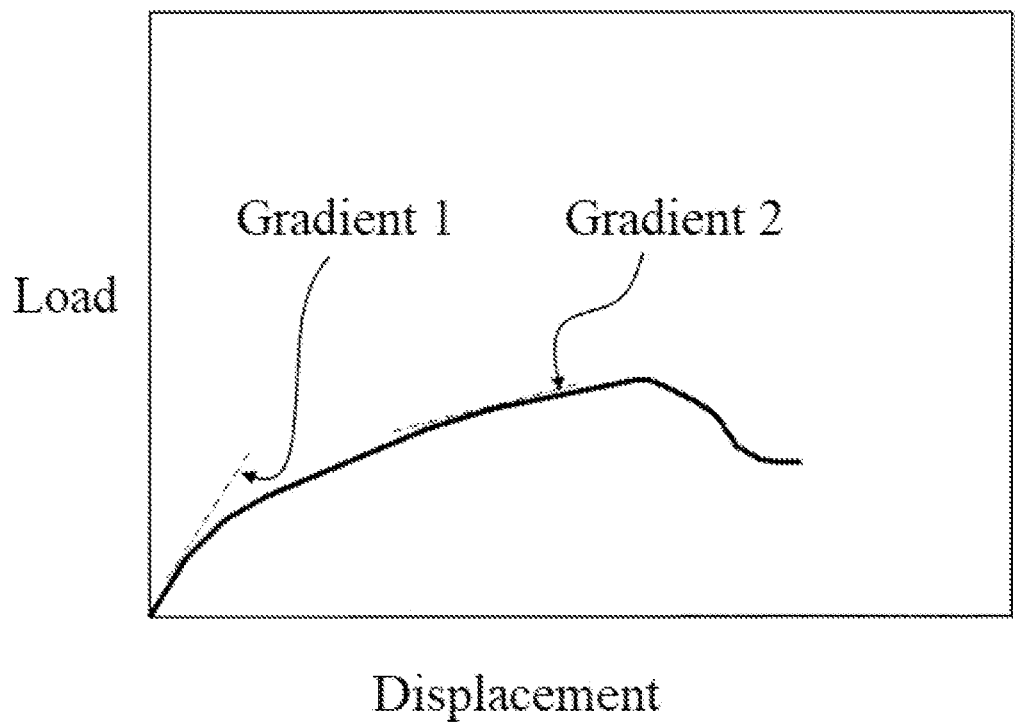
FIG. 6 is a graph showing a relationship between a load and displacement at a time when the external force is applied.

FIG. 6 is a graph showing a relationship between a load and displacement at a time when the external force is applied to the vehicle bumper A. The stiffness of the bumper beam portion B and the stiffness of each of the beam extension portions E are compared to each other by applying the load each as illustrated in FIG. 4 and FIG. 5, and by measuring the displacement at that time. A gradient 1 in FIG. 6 represents a relationship between the load and the displacement at the time when the external force is applied to the bumper beam portion B as illustrated in FIG. 4. Meanwhile, a gradient 2 in FIG. 6 represents a relationship between the load and the displacement at the time when the external force is applied to the bumper beam portion B as illustrated in FIG. 5. FIG. 6 demonstrates that the gradient 1 is steeper, that is, the bumper beam portion B is higher in stiffness than each of the beam extension portions E.

Note that, the configuration of the vehicle bumper according to the present invention is not limited only to that described above in this embodiment, and may be modified as appropriate within the gist of the present invention.

REFERENCE SIGNS LIST

A Vehicle bumper
B Bumper beam portion
C Continuous region
E Beam extension portion
M Vehicle body
B1, E2 Vertical wall portion
B2, E2 Upper wall portion
B3, E3 Lower wall portion
Bf, Ef Flange
Bk, Ek Void
Br, Er Reinforcing rib

The invention claimed is:

1. A vehicle bumper integrally comprising metal beam-extension portions being a part to be fixed to a vehicle body on both right-and-left end sides of a metal bumper-beam portion, wherein:
   the metal bumper-beam portion and the beam-extension portion include
   a vertical wall portion that faces a vehicle body side;
   an upper wall portion and a lower wall portion that extend respectively from an upper end and a lower end of the vertical wall portion to the vehicle body side;
   a resin reinforcing rib is joined to inner surfaces of a void formed of the vertical wall portion, the upper wall portion, and the lower wall portion;

an extension dimension of the upper wall portion and the lower wall portion of the metal beam-extension portions is larger than an extension dimension of the upper wall portion and the lower wall portion in the metal bumper-beam portion;

the resin reinforcing rib in the metal beam-extension portions is joined to the vertical wall portion, the upper wall portion, and the lower wall portion of the metal beam-extension portions; and stiffness of the metal bumper-beam portion is higher than stiffness of the metal beam-extension portions.

2. The vehicle bumper according to claim 1, wherein a total quantity of the resin reinforcing rib in the metal bumper-beam portion is larger than a total quantity of the resin reinforcing rib in the metal beam-extension portions.

3. The vehicle bumper according to claim 1, wherein the metal bumper-beam portion includes a plurality of the resin reinforcing ribs that are arrayed in a plurality of directions.

4. The vehicle bumper according to claim 1, wherein the metal beam-extension portions include a plurality of the resin reinforcing ribs that are arrayed at a predetermined interval in vehicle right-and-left direction.

5. The vehicle bumper according to claim 1, wherein each of the metal bumper-beam portion and the metal beam-extension portions has a flange at a tip of the upper wall portion and the lower wall portion in respective extension directions, and the metal bumper-beam portion and the metal beam-extension portions have a hat cross-sectional shape in the vehicle lateral direction.

6. The vehicle bumper according to claim 1, wherein the resin reinforcing rib is made of fiber reinforced plastics in which reinforcing fibers are oriented in a direction from the upper wall portion to the lower wall portion.

7. The vehicle bumper according to claim 1, wherein the vehicle bumper has an arcuate shape as a whole in plan view by including a continuous region in which the extension dimension of the upper wall portion and the lower wall portion gradually increases from the metal bumper-beam portion to the metal beam-extension portions.

8. The vehicle bumper according to claim 7, wherein stiffness of the continuous region is relatively lower than the stiffness of the metal bumper-extension portion.

9. The vehicle bumper according to claim 8, wherein the resin reinforcing rib is absent in the continuous region.

10. The vehicle bumper according to claim 1, wherein side end portions of the vertical wall portion, the upper wall portion, and the lower wall portion of the metal beam-extension portions jetty to an outer side relative to the resin reinforcing rib.

11. The vehicle bumper according to claim 2, wherein the metal bumper-beam portion includes a plurality of the resin reinforcing ribs that are arrayed in a plurality of directions.

12. The vehicle bumper according to claim 2, wherein the metal beam-extension portions include a plurality of the resin reinforcing ribs that are arrayed at a predetermined interval in vehicle right-and-left direction.

13. The vehicle bumper according to claim 2, wherein each of the metal bumper-beam portion and the metal beam-extension portions has a flange at a tip of the upper wall portion and the lower wall portion in respective extension directions, and the metal bumper-beam portion and the metal beam-extension portions have a hat cross-sectional shape in the vehicle lateral direction.

14. The vehicle bumper according to claim 2, wherein the resin reinforcing rib is made of fiber reinforced plastics in which reinforcing fibers are oriented in a direction from the upper wall portion to the lower wall portion.

15. The vehicle bumper according to claim 2, wherein the vehicle bumper has an arcuate shape as a whole in plan view by including a continuous region in which the extension dimension of the upper wall portion and the lower wall portion gradually increases from the metal bumper-beam portion to the metal beam-extension portions.

16. The vehicle bumper according to claim 2, wherein side end portions of the vertical wall portion, the upper wall portion, and the lower wall portion of the metal beam-extension portions jetty to an outer side relative to the resin reinforcing rib.

* * * * *